May 7, 1957 J. E. HANCOCK 2,791,041
EARTH HANDLING APPARATUS
Filed July 19, 1956 5 Sheets-Sheet 1
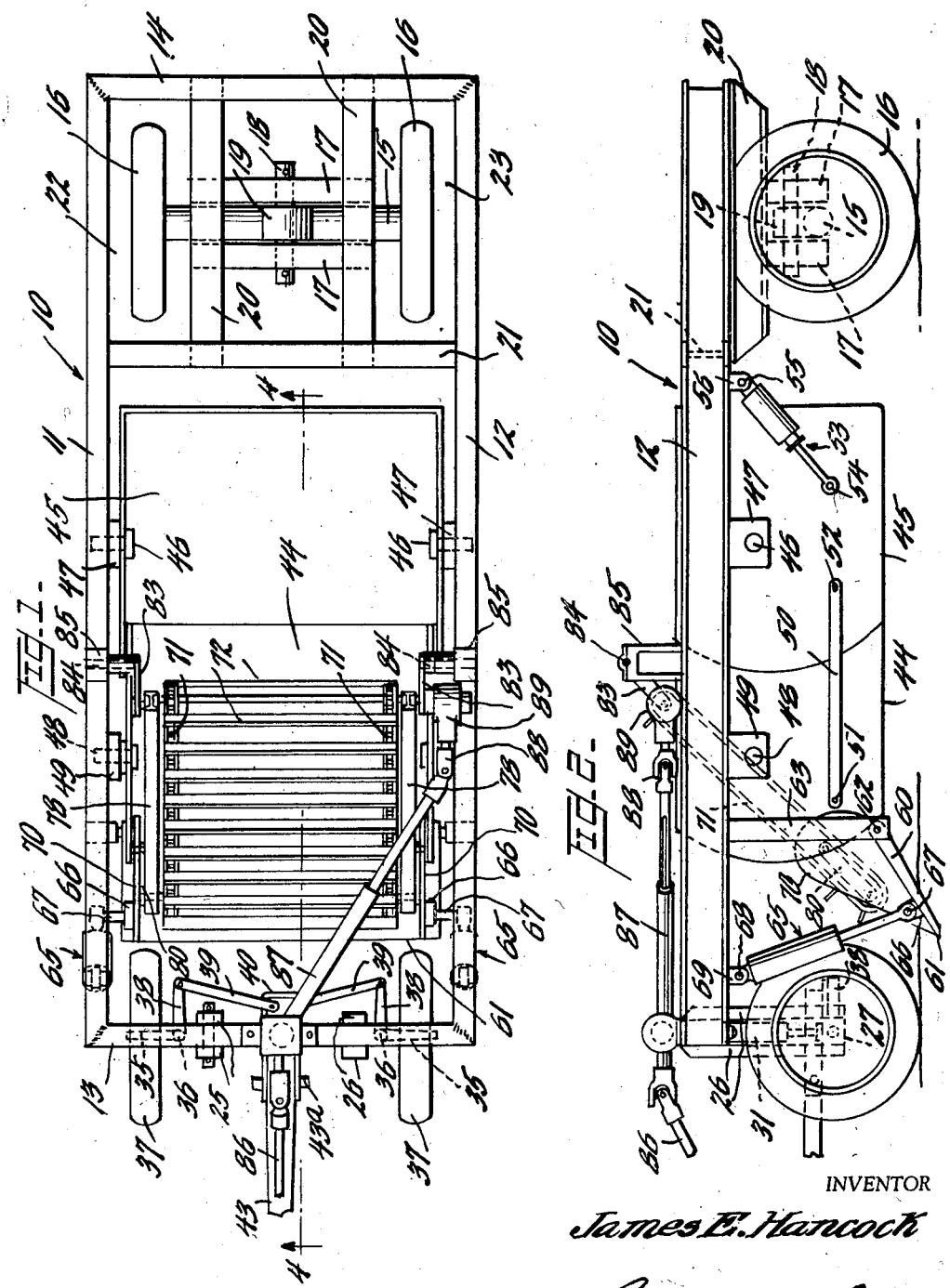
INVENTOR
James E. Hancock
BY Parker and Walsh
ATTORNEYS May 7, 1957 J. E. HANCOCK 2,791,041
EARTH HANDLING APPARATUS
Filed July 19, 1956 5 Sheets-Sheet 2
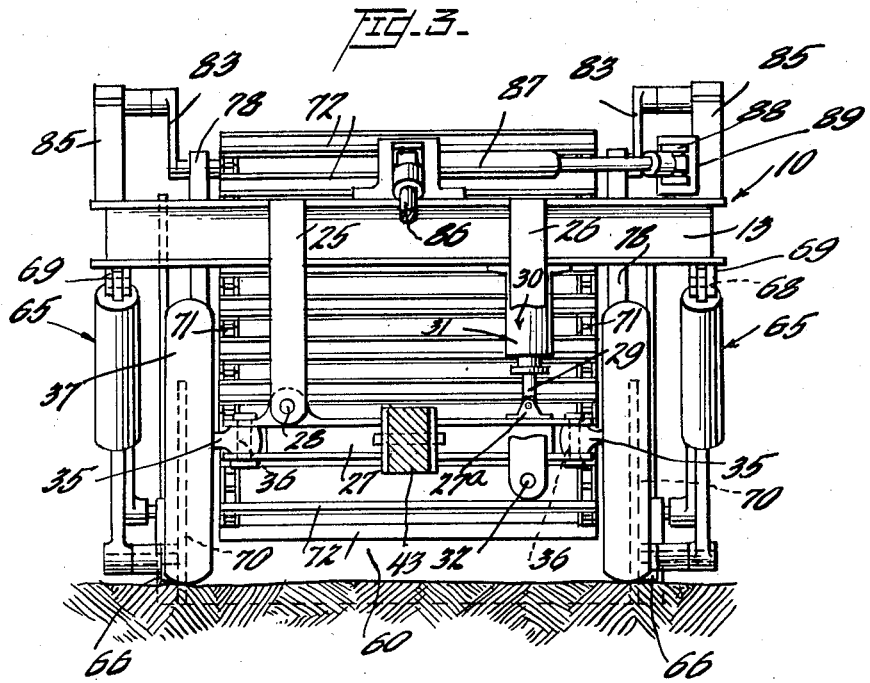
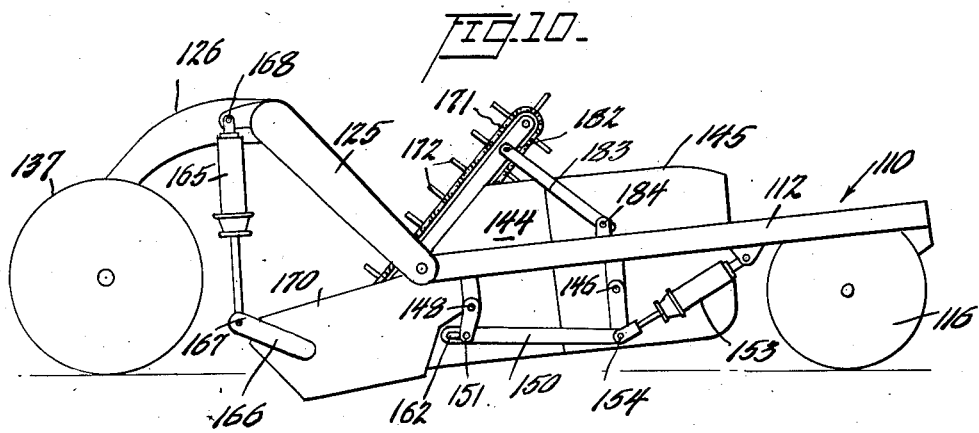
INVENTOR
James E. Hancock,
BY Parker and Walsh.
ATTORNEYS

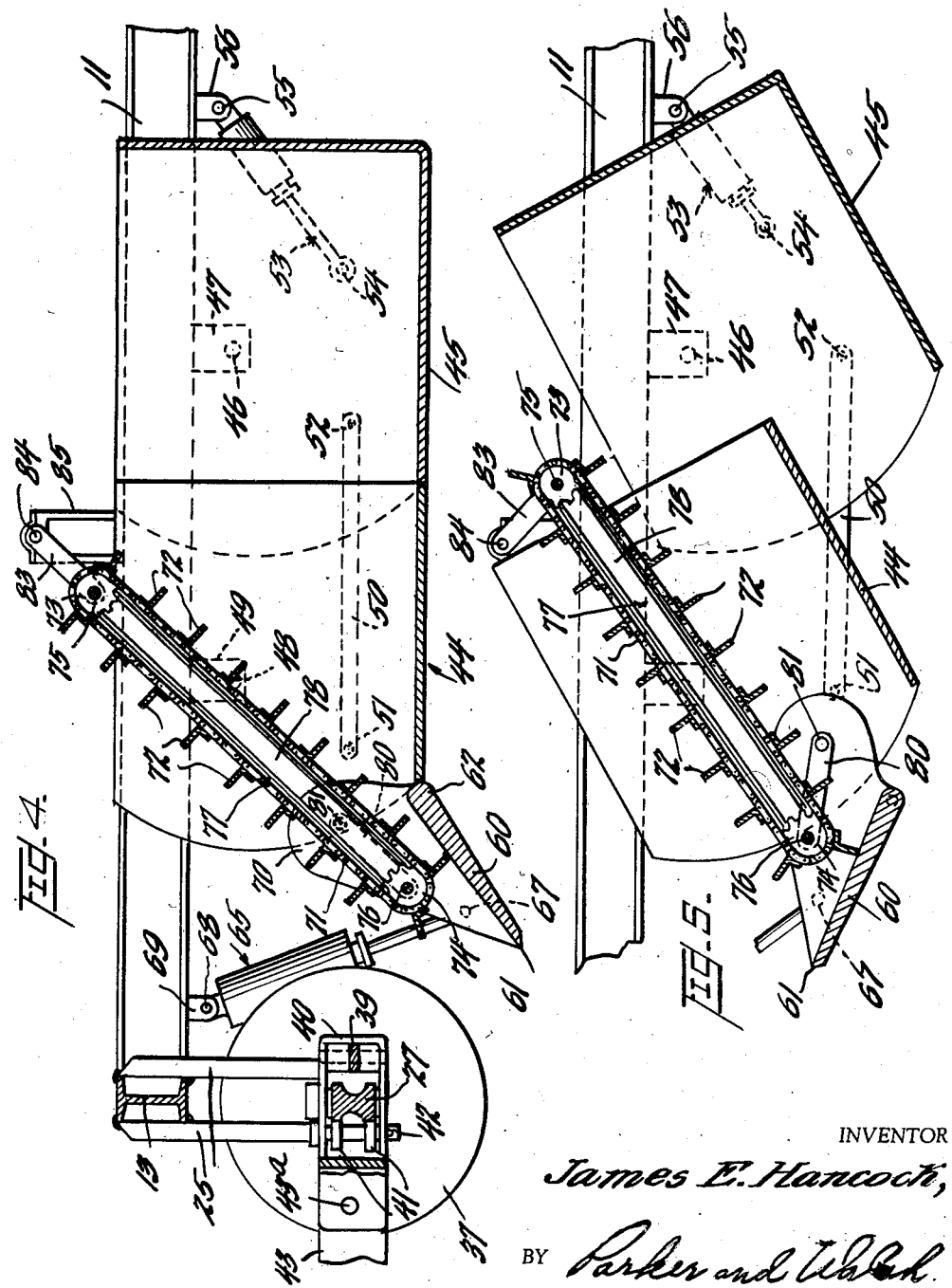

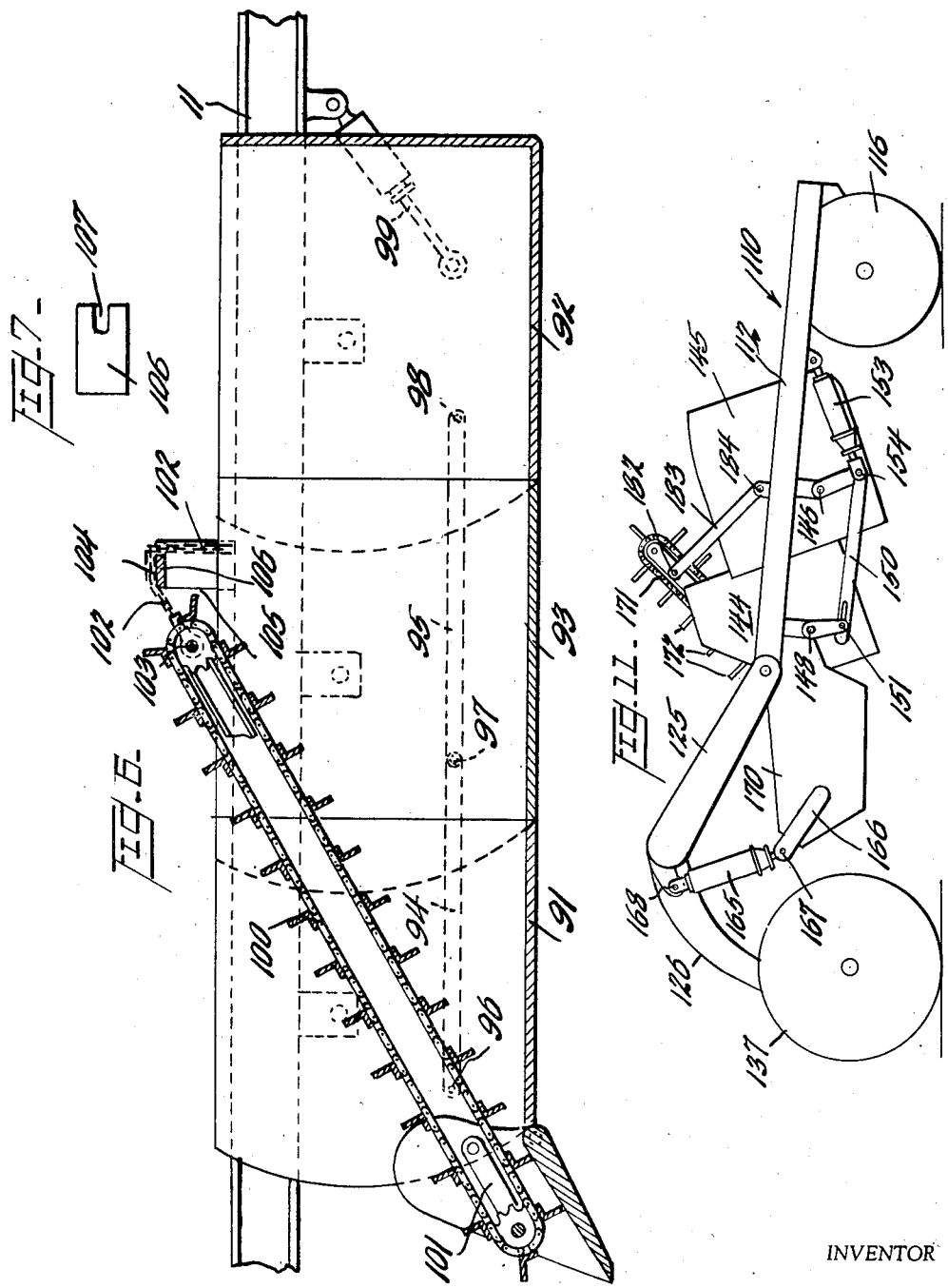

May 7, 1957   J. E. HANCOCK   2,791,041
EARTH HANDLING APPARATUS
Filed July 19, 1956   5 Sheets-Sheet 5
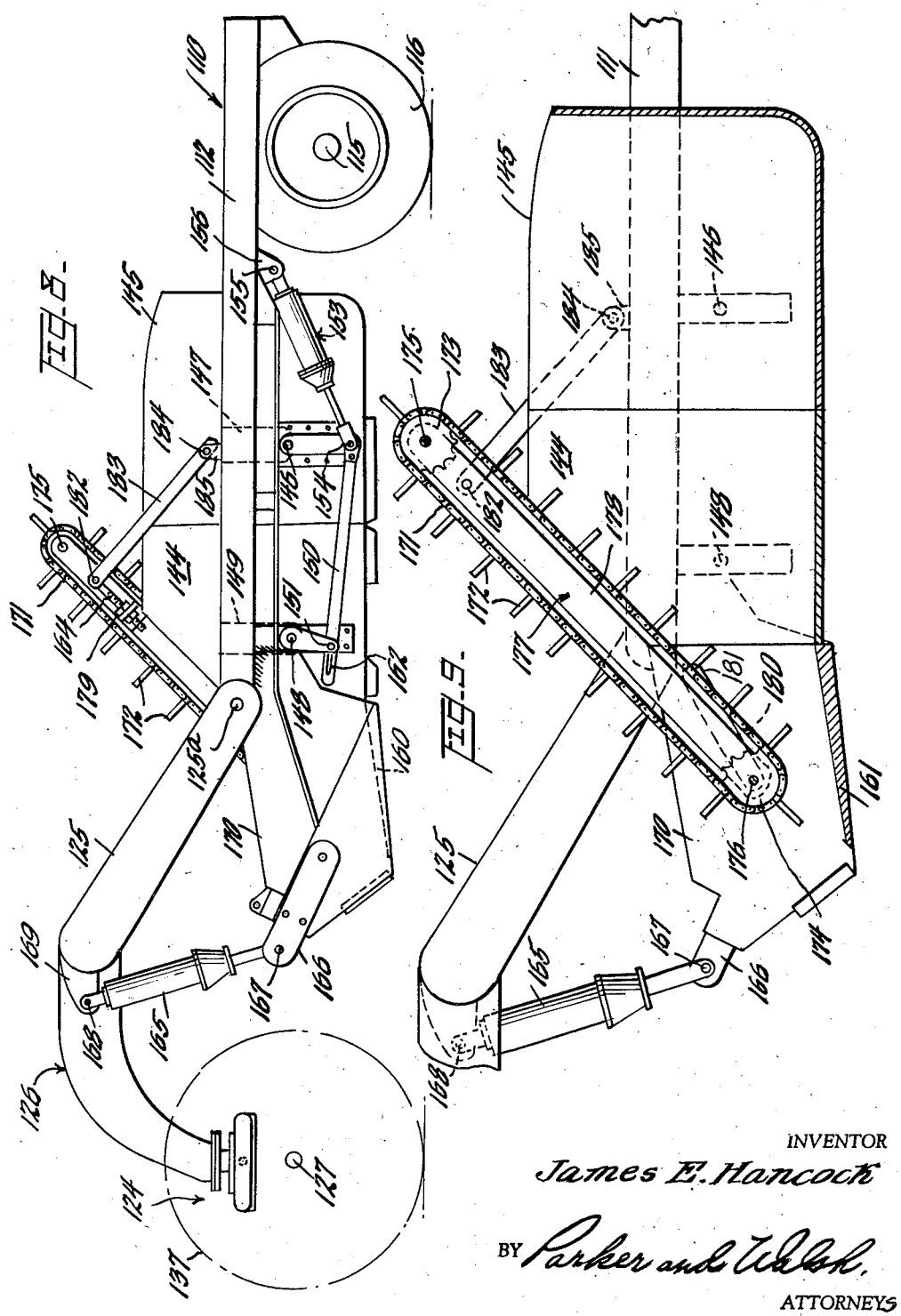
INVENTOR
James E. Hancock
BY Parker and Walsh,
ATTORNEYS

United States Patent Office 2,791,041
Patented May 7, 1957

2,791,041

EARTH HANDLING APPARATUS

James E. Hancock, Lubbock, Tex.

Application July 19, 1956, Serial No. 598,936

10 Claims. (Cl. 37—8)

This invention relates to tractor drawn apparatus for scraping, loading, transporting and spreading dirt.

A principal object of the invention is to generally improve the construction and operation of apparatus of this type to the end that dirt may be more expeditiously and efficiently scraped, loaded, transported to a place of use or disposal, and then dumped or spread as desired.

Still another object of the invention is the provision of apparatus of the indicated type having improved means for loading dirt which has been removed by the cutter or scraper.

A further object of the invention is the provision of apparatus of the indicated type wherein improved means are provided to facilitate unloading dirt.

These and other objects and advantages of the invention will become more apparent from the following detailed description, taken with the accompanying drawings, wherein:

Figure 1 is a top plan view of one form of apparatus in accordance with the invention;

Figure 2 is a side elevation of the apparatus shown in Figure 1;

Figure 3 is a front elevation of the apparatus;

Figure 4 is a vertical cross-sectional view of a portion of the apparatus taken on the line 4—4 of Figure 1;

Figure 5 is a vertical cross-sectional view of a portion of the apparatus, similar to Figure 4, but showing the box sections in dumping position;

Figure 6 is a vertical cross-sectional view, similar to Figure 5, showing a modified form of apparatus;

Figure 7 is a detailed plan view of a portion of the apparatus showing the manner of securing the conveyor supporting chains;

Figure 8 is a side elevation of another modified form of apparatus showing the apparatus in carrying position;

Figure 9 is a vertical cross-sectional view of a portion of the apparatus shown in Figure 8;

Figure 10 is a diagrammatic side elevation of the apparatus shown in Figure 8 but showing the apparatus in digging position; and Figure 11 is a similar view showing the apparatus in dumping position.

Referring to the drawings, the numeral 10 generally designates the supporting frame of the apparatus comprising side frame members 11 and 12 and front and rear frame members 13 and 14. These frame members preferably comprise steel I-beams, beveled at their ends, and welded or otherwise secured together to form the rectangular frame 10.

At its rear, the frame 10 is tiltably supported by a pivoted axle 15 having wheels 16 rotatably mounted on the ends thereof. The axle 15 is pivotally mounted between rectangular box-type steel beams 17 by a pivot pin 18 which extends through suitable openings in the beams 17 and in a flange 19 secured to the upper edge of the axle 15. The beams 17 are spaced apart to provide a slot therebetween within which the axle 15 can rock on the pin 18 thereby acting to prevent any possible swinging movement of the axle 15 about a vertical axis.

The beams 17 are carried by longitudinally extending I-beams 20, secured at their rear ends to the under side of the rear frame member 14 and at their forward ends to the under side of an intermediate transverse frame member 21. As will be apparent from Figure 1, the beams 20 are spaced from the side frame members 11 and 12 and the beam 21 from the rear frame member 14 to provide openings 22 and 23 into which the tops of the wheels 16 may project.

At its forward end, the frame 10 is provided with downwardly extending pairs of arms 25 and 26, secured at their upper ends, as by welding, to the front frame member 13. The pairs of arms 25 and 26 are mounted on opposite sides of the longitudinal center line of the apparatus and are connected at their lower ends with an axle structure now to be described.

In accordance with the invention, such axle structure comprises an axle 27 pivotally connected adjacent one end thereof (Figure 3), as by a pivot pin 28, to the lower ends of the arms 25. The axle 27 may be of any suitable construction as, for example, a modified I-beam, as shown, a box beam or the like. Adjacent its opposite end, the axle 27 is secured, as by a hinged connection 27a, to the piston rod 29 of a hydraulic jack mechanism 30 operatively positioned between the downwardly extending arms 26. The cylinder 31 of the hydraulic jack mechanism 30 is secured to the lower edge of front frame member 13 as by welding or the like. It will be apparent that when the hydraulic jack mechanism 30 is operated to extend or retract the piston rod 29 that the right hand end of the axle 27, as viewed in Figure 3, will be lowered or raised. This will swing the axle 27 about the pivot pin 28 to raise or lower one side of the frame 10 with respect to the other side, as will appear more clearly hereinafter. The arms 26 preferably extend downwardly below the axle 27 to serve as a guide therefor during its pivoting movement. A pin 32 connects the ends of the arms 26 to hold them in spaced position and to act as a stop for the axle.

At its ends, the axle 27 carries auto-type spindles 35 pivotally secured thereto by pins 36. Wheels 37 are rotatably mounted on the spindles 35 in the usual manner. The spindles 35 are provided with steering arms 38 (Figure 1), which extend rearwardly therefrom and are pivotally connected at their ends to radius rods 39. The radius rods 39, in turn, are pivotally connected at their inner ends to a yoke member 40 which straddles the axle 27 at the center thereof as shown in Figure 4. The yoke member 40 is pivotally connected to ears 41, secured to and extending forwardly from the axle 27, by a pin 42. A tongue 43 is pivotally connected to the forward end of the yoke member 40, as at 43a, and has means (not shown) on the forward end thereof for attachment to the hitch of a tractor or similar prime mover. It will be apparent that when the tongue 43 swings horizontally it will swing the member 40 about the pivot pin 42 to thereby turn the wheels 37 through the radius rod connections 39 and steering arms 38.

It will be noted that the frame 10 has a three point suspension or support, namely, one at the rear which is pivotal and two at the front, and that the front suspension is pivotal at one side and vertically adjustable at the other side to permit tilting of the frame to different operative positions. The reasons for this will become more apparent hereinafter.

Dirt collecting boxes 44 and 45 are carried by the frame 10 and may be moved between the dirt carrying positions shown in Figure 4 and the dumping position shown in Figure 5. The rear box 45 has a bottom, a back and two sides, and is pivotally mounted, as at 46, on ears 47 secured to and depending downwardly from the side frame members 11 and 12. The box 44 has a bottom and two sides and is open at the front and back. In the dirt loading and transporting position of the boxes the rear bottom edge of the box 44 abuts the forward bottom edge of the box 45 to provide a substantially continuous bottom. The sides of the box 45 are offset outwardly slightly from the sides of the box 44 and are arranged in overlapping relation therewith when the boxes are in dirt loading and dirt carrying positions, as clearly shown in Figures 1 and 4. The box 44 is pivotally mounted, as at 48, on ears 49, secured to and depending downwardly from the frame members 11 and 12.

The boxes 44 and 45 are linked together, for simultaneous swinging movement, by links 50, pivotally connected at their ends, as at 51 and 52, to the side walls of the boxes. Such swinging movement of the boxes is controlled by hydraulic cylinder and piston mechanisms 53 pivotally connected at their forward ends as at 54, to the side walls of the box 45, and pivotally connected at their rear ends, as at 55, to ears 56 welded or otherwise secured to the lower edges of the side frame members 11 and 12. When the pistons of the hydraulic cylinder and piston mechanisms 53 are extended or withdrawn it will be apparent that the buckets 44 and 45 will be simultaneously swung about their pivot connections 48 and 46.

The dirt scraping mechanism now to be described, is best shown in Figures 2, 4 and 5. Such scraping mechanism comprises a scraper blade 60 having a forward cutting edge 61 and a rear shaft portion 62. The shaft portion 62 is pivotally mounted at its ends in suitable bearing openings formed in posts 63, secured to the side frame members 11 and 12 and depending downwardly therefrom, as best shown in Figure 2. In the dirt carrying position shown in Figure 4, the forward bottom edge of the box 44 closely abuts the rear surface of the shaft 62 to prevent the seepage of dirt therebetween.

The scraper blade 60 is raised, lowered and held in any desired adjusted position, by hydraulic cylinder and piston mechanisms 65. The blade 60 is provided adjacent each side edge thereof with upstanding ears 66 to which the lower ends of the hydraulic mechanisms 65 are pivotally connected as at 67. At their upper ends, the hydraulic mechanisms 65 are pivotally connected as at 68, to depending ears 69 secured to the under sides of the side frame members 11 and 12.

Adjacent each side thereof, the scraper blade 60 is provided with upstanding flanges 70. These flanges serve to confine the dirt on the blade 60 and guide it rearwardly into the open end of the box 44. Such flanges also serve the additional function of pivotally supporting the conveyor mechanism now to be described.

The conveyor mechanism is preferably of the chain-drag type comprising spaced conveyor chains 71 to which are secured transverse conveyor flights 72. The chains 71 are trained over sprockets 73 and 74 mounted on axles or shafts 75 and 76 rotatably journaled at the upper and lower ends of a frame 77. The frame 77 may desirably be formed of side frame members 78 secured in spaced relation by any suitable type of cross frame members to provide a substantially rigid frame.

At the lower end, the chain drag conveyor is supported by swinging arms 80 pivotally connected at their rear ends, as at 81, to the upstanding flanges 70, and pivotally connected, at their forward ends, to the conveyor shaft 76. At its upper end, the conveyor is supported by swinging arms 83 pivotally connected, at their upper rear ends, as at 84, to uprights 85 mounted on the side frame members 11 and 12, and at their lower forward ends to the conveyor shaft 75. This provides a floating type conveyor, the lower end of which is free to raise up over rocks or other obstructions encountered during operation of the apparatus. When the scraper blade 60 is raised or lowered, the lower end of the conveyor which normally rests thereon is likewise raised or lowered. Also during such raising and lowering of the scraper blade the pivot points 81 swing in an arc about the shaft 62 to swing the conveyor rearwardly. The swinging arms 83 which support the upper end of the conveyor permit such movement as clearly shown in Figure 5.

The chain drag conveyor is driven from the tractor or other prime mover by power takeoff shafts 86 and 87 drivingly connected by any suitable type of universal joint. The shaft 87 is of the telescopic type and is drivingly connected by a universal joint 88 with a gear device 89. The device 89 is mounted on the frame of the conveyor and drivingly connected with the upper conveyor shaft 75.

The hydraulic cylinder and piston mechanisms 30, 53 and 65, are actuated from hydraulic control mechanism on the tractor or other prime mover through suitable connecting tubes or pipes (not shown).

The apparatus of the invention is readily adaptable for use with any desired number of dirt collecting boxes. Three of such box sections are shown in the modified form of the invention illustrated in Figure 6 but more may be used if desired. As there shown, the boxes 91 and 92 are generally similar to the boxes 44 and 45 previously described. The box 93, like the box 91, has bottom and side walls, but is open at the front and back. The side walls of the boxes overlap as in the previous embodiment to prevent escape of dirt during the loading and transporting operations. The boxes 91, 92 and 93 are interconnected for simultaneous swinging movement by links 94 and 95 pivotally connected to the side walls of the boxes as at 96, 97 and 98. As before, the boxes are swung by a hydraulic cylinder and piston mechanism 99 pivotally connected between the side frame members 11 and 12 and the side walls of the box 92.

In the form of the invention shown in Figure 6 the lower end of the chain drag conveyor 100 is supported as before, namely, by swinging links 101. However, due to the greater combined lengths of the box sections in this form of the invention, and the corresponding greater length of the conveyor 100, it is preferred to support the upper end thereof by adjustable chains 102. These chains are secured to the upper conveyor shaft 103 of the conveyor and pass upwardly over a transverse supporting member 104, for example, a steel channel beam, angle iron or the like, secured to uprights 105 mounted on the side frame members 11 and 12, and having a horizontal flange 106. In a preferred arrangement, the flange 106 of the member 104 is provided with slots 107 for locking the chains 102 in any desired adjusted position. Such slots are slightly greater in width than the thickness of the chain links so that when one of same is positioned in each of the slots the next adjacent link toward the end of the chain will abut the edges of the slot to prevent the chains from pulling therethrough. It will be apparent that by suitable adjustment of the chains 102 the upper end of the conveyor may be raised or lowered as desired. For most purposes, it has been found desirable to arrange the conveyor at an angle of approximately 30° to the horizontal, although this may be varied as desired.

Referring to the modification shown in Figures 8 to 11 inclusive, the numeral 110 generally designates the supporting frame of the apparatus comprising side frame members 111 and 112. These and the other frame members not specifically referred to, may be assembled in much the same manner as the form of the invention shown in Figures 1 to 5.

At its rear, the frame 110 is supported upon axle 115 having wheels 116 rotatably mounted on the ends thereof. At its forward end, the frame 110 is connected at each side through pivots 125a to a pair of arms 125 which form part of gooseneck 126. The gooseneck 126 rests on a fifth wheel structure generally indicated at 124 which forms a part of a dolly having an axle 127 upon which a pair of wheels 137 are mounted. Alternatively, the gooseneck 126 may rest directly upon the rear wheels of a suitable prime mover.

Boxes 144 and 145 are carried by the frame 110 and may be moved between the dirt carrying positions shown in Figures 8 to 10 and the dumping position shown in Figure 11. The rear box 145 has a bottom, a back and two sides, and is pivotally mounted as at 146, on ears 147 secured to the inner faces of side frame members 111 and 112 and depending downwardly therefrom. The box 144 has a bottom and two sides and is open at the front and back. In the dirt loading and transporting positions of the boxes, the rear bottom edge of the box 144 abuts the forward bottom edge of the box 145 to provide a substantially continuous bottom. The sides of the box 145 are offset outwardly slightly from the sides of the box 144 and are arranged in overlapping relation therewith when the boxes are in dirt loading and dirt carrying positions as shown in Figures 8 and 9. The box 144 is pivotally mounted, as at 148, on ears 149 secured to the inner faces of the frame members 111 and 112 and depending downwardly therefrom.

The boxes 144 and 145 are linked together for joint swinging movement by links 150, pivotally connected at their ends, as at 151 and 154 to the side walls of the boxes. Such swinging movement of the boxes is controlled by hydraulic cylinder and piston mechanisms 153 pivotally connected at their forward ends as at 154, to the side walls of the box 145 and pivotally connected at their rear ends, as at 155, to ears 156 welded or otherwise secured to the side frame members 111 and 112. When the pistons of the hydraulic cylinder and piston mechanisms 153 are withdrawn, it will be apparent that the bucket 145 will be initially swung about its pivot connection 146 and, as the pin 151 travels through the slot 152, its full length of travel, the bucket 144 will also be swung about its pivot 148. By emptying the boxes in this manner, the dirt is spread more evenly at the point of discharge.

The dirt scraping mechanism of the modification of Figures 8 to 11 will now be described. An extension 160 of frame mmebers 111 and 112 extends forwardly thereof with its bottom forming a continuous surface with the bottoms of boxes 144 and 145 when the apparatus is loading or carrying. The extension terminates in a cutting edge 161. The sides of the extension are extended upwardly at 170. The entire forward portion of frame members 111 and 112 is raised, lowered and held in any desired adjusted position by hydraulic cylinder and piston mechanisms 165. Attached to the forward portions of sides 170 are ears 166 to which the lower ends of the hydraulic mechanisms 165 are pivotally connected as at 167. At their upper ends, the hydraulic mechanisms 165 are pivotally connected as at 168 to forwardly extending ears 169, attached to arms 125.

The conveyor mechanism is constructed in essentially the same manner as that disclosed in Figures 1 to 5. Reference numerals 171 through 178 correspond to reference numerals 71 to 78 in Figures 1 through 5. Reference numeral 179 refers to one of the upper cross frame members connecting side frame members 178.

At its lower end, the chain drag conveyor is supported by swinging arms 180 pivotally connected at their rear ends, as at 181 to the sides 170 of the blade extension 160 of frame members 111 and 112, and pivotally connected, at their forward ends, to the conveyor shaft 176. At its upper end, the conveyor is supported by swinging arms 183 pivotally connected, at their rear ends, as at 184 to uprights 185 mounted on the side frame members 111 and 112, and at their forward ends 182 to I-bolts 164 secured in cross member 179. Although the points of support of lower arm 180 and upper arm 183 differ in the construction shown in Figures 1 to 5, the operation of the floating conveyor in rising and falling on the dirt entering box 144, is essentially the same. Additionally, in the construction shown in Figures 8 to 11, the conveyor acts to prevent loss of dirt from box 144 when the apparatus is in carrying position.

The chain drag conveyor shown in Figures 8 to 11 is driven in a manner similar to the conveyor of Figures 1 to 5 and the hydraulic cylinder and piston mechanisms are actuated from hydraulic control mechanism on the prime mover also similarly to the apparatus shown in Figures 1 to 5.

*Operation*

In the operation of the apparatus, the tongue 43 is secured to the hitch of a tractor and the shaft 86 connected to the power take-off of the tractor in a well known manner. The pipes or tubing (not shown) leading from the hydraulic cylinder and piston mechanisms are then connected to the hydraulic control and actuating mechanism on the tractor and the device is ready to be put into operation.

During the dirt scraping and loading operation the parts of the apparatus are disposed as shown in Figures 2, 4 and 6. As the apparatus moves forwardly over the ground the scraper blade 60 scrapes or digs the dirt to the particular depth for which the scraper blade is set by the hydraulic cylinder and piston mechanisms 65. The dislodged dirt collects on the scraper blade 60 where it is engaged by the flights 72 of the conveyor and moved upwardly and rearwardly for discharge into the boxes 44 and 45. The dirt initially will be deposited for the most part, in the box 44. However, as the box 44 fills up, due to the action of the conveyor, the dirt will also be carried into the box 45 until both are substantially full.

When the boxes are filled, the scraper blade 60 is raised to the forwardly and upwardly inclined dirt transporting position of the apparatus as shown in Figure 5. This is accomplished by actuation of the hydraulic cylinder and piston mechanisms 65 through the operation of controls on the tractor by the operator thereof. As the scraper blade 60 moves to its dirt carrying position, the lower end of the conveyor is swung upwardly and rearwardly by virtue of its pivotal connection, as at 81, to the flanges 70. Simultaneously therewith, the upper end of the conveyor swings rearwardly on the arms 83 to the position shown in Figure 5.

With the parts thus positioned, the load of dirt is then transported to any desired point for dumping. In order to dump the dirt, the boxes 44 and 45 are swung rearwardly to the positions shown in Figure 5 by actuation of the hydraulic cylinder and piston mechanisms 53. In such positions it will be noted that the forward bottom edge of the box 44 is spaced rearwardly from the rear surface of the shaft 62 and that the forward bottom edge of the box 45 is spaced rearwardly and downwardly from the rear bottom edge of the box 44. This provides relatively large discharge openings through which the dirt quickly passes from the downwardly inclined bottoms of the boxes 44 and 45 and from the downwardly inclined scraper blade 60.

When the dirt has been dumped, as aforesaid, the boxes are returned to the positions shown in Figure 4 following which the scraper blade 60 may be lowered to initiate another dirt scraping and loading operation. In prior apparatus of this general type, there is frequently a tendency for one end of the scraper blade to make a deeper cut than the other. This results in undue strains on the apparatus, and in addition, makes it impossible to provide a level scraped surface. In accordance with the present invention, this condition is very easily overcome by suitable adjustment of the hydraulic jack mechanism 30. This raises or lowers one side of the frame 10 with respect to the other and since the scraper blade is carried by posts secured to the frame one side of the blade is correspondingly raised or lowered with respect to the other side, to thereby correct the stated condition. Such mode of operation of the present apparatus is made possible by the single point pivoted connection of the rear axle, together with the pivoted connection of the front axle at one side thereof and the adjustable connection at the other side.

In the operation of the apparatus it frequently happens that large rocks are dislodged by the scraper blade and move upwardly thereon into the path of the conveyor blades. In the case of a rigidly mounted conveyor such rocks would result in destructive strains thereon and in most cases would cause breakage or serious damage. However, with the pivoted arm connections of the present invention, the lower end of the conveyor is permitted to swing forwardly and upwardly over the rocks without strain on or damage to the parts.

The operation of the modified forms of the invention shown in Figures 6 and 7, is similar to that previously described. Such form of the invention, however, has the added advantages that the upper end of the conveyor may be raised and lowered, in addition to its swinging movement, to better adapt it to various operating conditions.

Figure 10 shows the dirt loading position of the apparatus shown in Figures 8 to 11, inclusive. During this operation, the piston of hydraulic cylinder 165 is extended to cause cutting edge 161 to bite the surface of the ground. When the boxes are full, the piston of cylinder 165 is retracted as shown in Figure 8 raising cutting edge 161 above the surface; the conveyor mechanism serves to prevent loss of dirt from the boxes.

When it is desired to dump the dirt from boxes 144 and 145, the pistons of hydraulic mechanisms 153 are retracted, causing box 145 to tip first and, as links 150 are drawn further back the slot 152 passes pin 151 until the forward end of link 150 enages pin 151 to also tip box 144. When the pistons of hydraulic mechanisms 153 are thrust outwardly again, this operation is reversed to close the boxes.

It will thus be seen that the present invention provides a highly effective apparatus of the indicated type for handling dirt. While preferred forms of the invention have been disclosed herein, the invention is not to be construed as limited to the specific details illustrated and described, except as included in the appended claims.

For so much of the subject matter of my application, Serial No. 333,575, filed January 27, 1953, as is common to this application, a continuation-in-part thereof, I claim the benefit of the filing date of that application.

I claim:

1. Apparatus for handling dirt comprising a mobile frame, a dirt collecting open front box mounted on said frame, a dirt removing scraper mounted on said frame in advance of said dirt collecting box, discharging thereinto, flanges secured to and extending upwardly from said scraper adjacent the ends thereof, an inclined endless scraper-type conveyor mounted at its upper rear on said frame for moving dirt from said scraper into said dirt collecting box and a pair of arms pivotally connected at one end of each to one each of said flanges and at the opposite end, one to each side of the lower front end of said conveyor, to enable the conveyor to float upon the dirt passing over the scraper.

2. Apparatus for handling dirt comprising a mobile frame, an open-front, dirt collecting box mounted on said frame, a dirt removing scraper mounted on said frame in advance of said dirt collecting box, an endless conveyor structure for moving dirt from said scraper into said dirt collecting box, said conveyor structure extending upwardly and rearwardly with respect to said frame, first means linking the lower portion of the conveyor to the forward, lower portion of the frame, second means linking the upper portion of the conveyor to an upper, more rearward portion of the frame, both said linking means cooperating for swinging movement of the conveyor by gravity on the dirt in a generally vertical plane.

3. Apparatus of the type set forth in claim 2 in which the means linking the upper portion of said conveyor structure to said frame comprise arms pivotally connected at one of each of their ends to said conveyor structure and the other respective end to said frame.

4. Apparatus for handling dirt comprising a mobile frame, an elongated multi-sectional, open front, unobstructed dirt collecting box, each section thereof being mounted pendant from said frame for swinging movement between a dirt loading and carrying position and a dirt discharging position, a dirt-removing scraper carried by said frame in front of said dirt-collecting box and over which dirt passes to said box, means mounted on the forward part of the frame for transferring dirt from the surface of the scraper to the rear portion of the dirt-collecting box and means for driving the dirt transfer means when the frame is not in motion.

5. The apparatus of claim 4 wherein the dirt transferring means also serves to prevent escape of dirt from the dirt collecting box when the apparatus is in dirt carrying position.

6. Apparatus for handling dirt comprising a mobile frame, an elongated box open on the top and front only, a scraper blade movable into and out of dirt removing position mounted on said frame in advance of said box and discharging directly thereinto, a scraper-type conveyor supported upon the frame, at the front part of the box in inclined relation, upwardly and to the rear, said conveyor being supported for free swinging movement for gravitational riding upon the dirt displaced by and passing over the scraper blade and into the box, said conveyor serving to impede the discharge of dirt from the front of said box when the scraper blade is out of dirt removing position and means for driving the conveyor in both loading and carrying positions of the apparatus.

7. The apparatus of claim 6 wherein the scraper blade is moved into and out of dirt removing position by raising and lowering the forward part of the frame.

8. The apparatus of claim 6 wherein the conveyor is connected at its upper end by a pair of links, one at each side to the upper part of the frame.

9. The apparatus of claim 6 wherein the conveyor is connected at its lower end, by a pair of links one at each side, to a forward part of the frame.

10. The apparatus of claim 7 wherein the conveyor is connected at its upper end, by a pair of links, one at each side to the upper part of the frame and at its lower end, by a second pair of links, one at each side, to a forward part of the frame.

References Cited in the file of this patent

UNITED STATES PATENTS

| Number | Name | Date |
| --- | --- | --- |
| Re. 21,170 | Paulsen | Aug. 1, 1939 |
| 242,481 | Seibert | June 7, 1881 |
| 305,784 | Best | Sept. 30, 1884 |
| 645,825 | Nash | Mar. 20, 1900 |
| 649,017 | Tiedemann | May 8, 1900 |
| 878,890 | Pearson | Feb. 11, 1908 |
| 1,332,662 | Gross | Mar. 2, 1920 |
| 1,399,876 | Pulliam | Dec. 13, 1921 |
| 1,486,376 | Hassell | Mar. 11, 1924 |
| 1,828,526 | Faverty | Oct. 20, 1931 |
| 1,858,599 | Renaud | May 17, 1932 |
| 2,017,477 | Shippee | Oct. 15, 1935 |
| 2,207,424 | Wood | July 9, 1940 |
| 2,243,831 | Berner | June 3, 1941 |
| 2,293,328 | Coburn | Aug. 18, 1942 |
| 2,365,387 | Briscoe | Dec. 19, 1944 |
| 2,412,179 | Sensenig | Dec. 3, 1946 |
| 2,464,098 | Pittlick | Mar. 8, 1949 |
| 2,510,424 | Shook | June 6, 1950 |
| 2,514,091 | Renaud | July 4, 1950 |
| 2,546,907 | Sherwood | Mar. 27, 1951 |
| 2,569,719 | Huhne | Oct. 2, 1951 |
| 2,651,120 | Miller | Sept. 8, 1953 |